W. J. AND S. HARDING.
ICE CREAM CONE TRAY.
APPLICATION FILED JULY 29, 1920.

1,370,811.

Patented Mar. 8, 1921.

W. J. & S. Harding, INVENTOR.

BY Lacy & Lacy, ATTORNEYS.

UNITED STATES PATENT OFFICE.

WILLIAM J. HARDING AND SAMUEL HARDING, OF JOHNSTOWN, NEW YORK.

ICE-CREAM-CONE TRAY.

1,370,811.

Specification of Letters Patent.

Patented Mar. 8, 1921.

Application filed July 29, 1920. Serial No. 399,838.

*To all whom it may concern:*

Be it known that we, WILLIAM J. HARDING and SAMUEL HARDING, citizens of the United States, residing at Johnstown, in the county of Fulton and State of New York, have invented certain new and useful Improvements in Ice-Cream-Cone Trays, of which the following is a specification.

This invention relates to improvements in trays especially adapted for carrying ice cream cones and small boxes of ice cream.

An important object of this invention is to provide a tray having novel means whereby an ice cream box or container may be carried so that the cones also carried by the tray may be filled as desired.

A further object of the invention is to provide an ice cream cone tray having a handle which extends into the opening adapted for the reception of the ice cream box so as to engage the box and thereby prevent the same from accidentally falling from the tray.

A further object of the invention is to provide a tray of the class described which is neat in appearance, desirable in use, and cheap to manufacture.

Other objects and advantages of the invention will be apparent during the course of the following description.

In the accompanying drawings forming a part of this application and in which like reference numerals are employed to designate like parts throughout the same:

Figure 1:
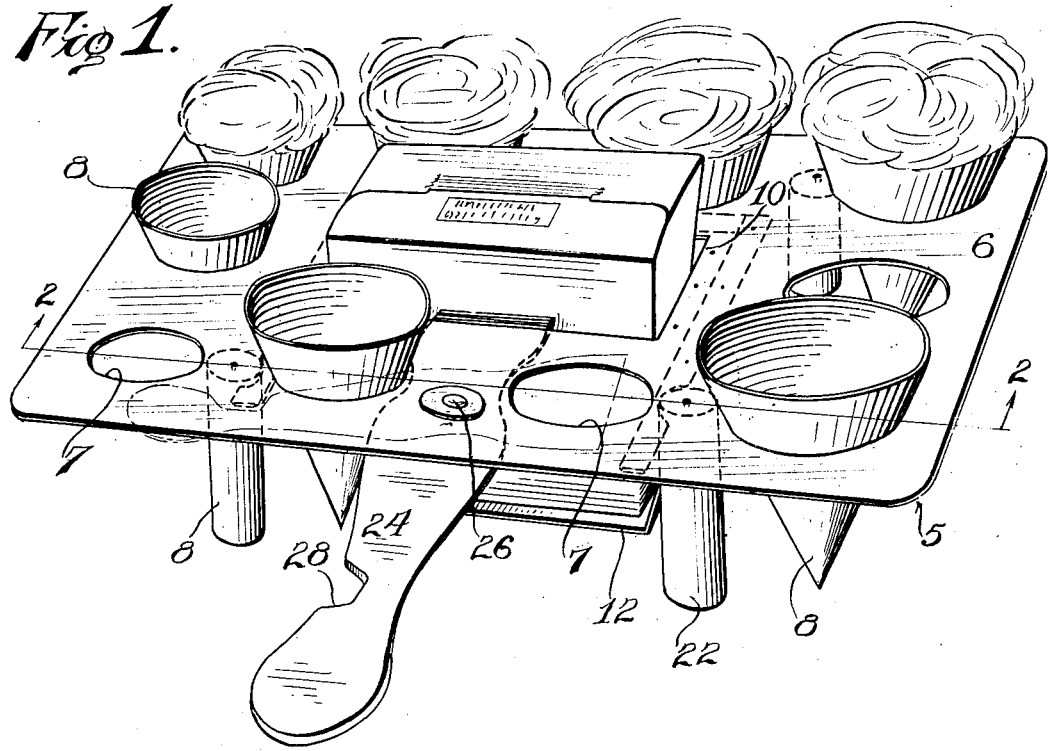
Figure 1 is a perspective view of the improved tray in use.

In the drawing wherein for the purpose of illustration is shown a preferred embodiment of the invention, the numeral 5 generally designates the tray, which consists of a flat body 6 having a plurality of openings 7 adapted for the reception of ice cream cones 8. It will be noted with reference to Fig. 1, that the cone receiving openings 7 are arranged about the edge portion of the body 6 and while some of the cones may be filled the other cones may remain empty to be filled with ice cream at the time of sale.

The flat body 6 is provided with a centrally arranged opening 10 of rectangular formation and said opening is adapted to receive an ice cream box 11.

Figure 2:
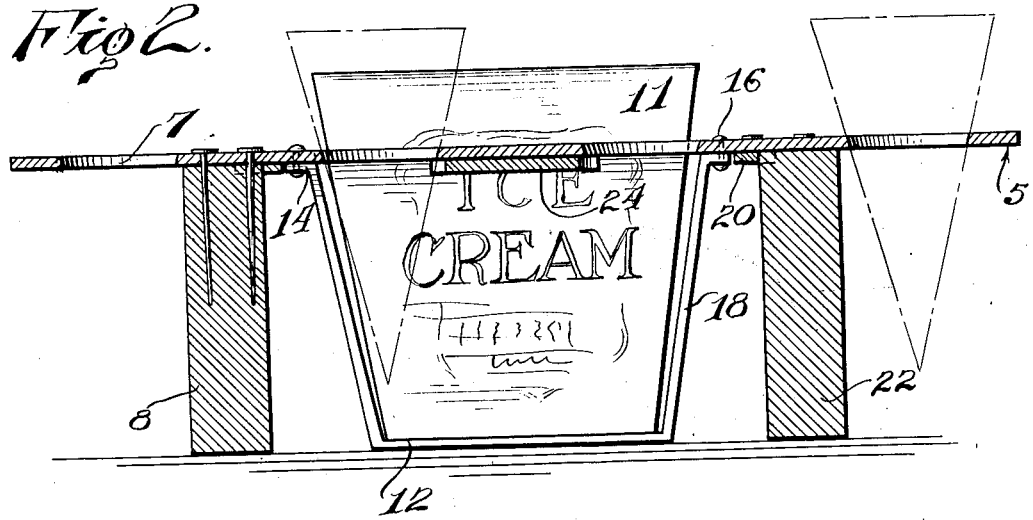
Fig. 2 is a central vertical longitudinal sectional view taken on the line 2—2 of Fig. 1.

As illustrated in Fig. 2, a U-shaped shelf or support 12 is suspended from the under side of the tray body directly beneath the opening 10 and constitutes a pocket for the reception of the box 11. The end portions of the material from which the suspended shelf is formed are extended laterally as indicated at 14, and said end portions are secured to the tray body by means of rivets 16 or the like. The sides 18 are gradually flared outwardly to conform to the inclination of the sides of the ice cream box. Suitable reinforcing strips 20 may be secured to the under side of the body of the tray and serve as a means for preventing the side walls of the opening 10 from tearing and also serve as a means for stiffening the body. The bottom of the pocket which receives the ice cream box terminates in the plane of the lower ends of a plurality of legs 22 so that when the tray is laid upon a table or other support, the bottom of the pocket or shelf for supporting the ice cream box will also rest flatly upon the table. In this manner, the shelf is relieved of all strain when the tray is mounted upon a table.

The tray is provided with a handle 24 pivoted adjacent its forward end to the under side of the body 6 by means of a pivot pin 26. With reference to Fig. 1, it will be observed that the forward end of the handle 24 projects into the opening 10 and engages the ice cream box so that said box is prevented from dropping out of the opening when the tray is being carried from place to place. The handle may, however, be swung entirely beneath the body when the tray is not in use and is provided with a notch 28 which is adapted to receive the upper portion of one of the legs 22. The notch 28 also constitutes a finger receiving opening so that the handle may be securely gripped.

In the use of the invention, some of the cones or all of them may be filled with ice cream and a box of ice cream may be placed within the pocket. If desired, the cones may be provided with ice cream from the box or the box of ice cream may be sold separately.

The device is neat in appearance, is possessed of a large carrying capacity and is desirable in use.

Having thus described the invention, what is claimed as new is:

1. An ice cream cone tray comprising a body having a plurality of cone receiving openings, said body being provided with a centrally arranged opening, a U-shaped shelf suspended below said opening and adapted for supporting an ice cream box within said centrally arranged opening, and legs secured to said body and terminating flush with the under side of said shelf.

2. An ice cream tray comprising a body having means for supporting ice cream cones and provided with an opening, a shelf suspended from said body beneath said opening thereby constituting a pocket for the reception of an ice cream box, and a handle pivoted to said body, the forward end of said handle being adapted to extend into said pocket and engage the ice cream box to secure the same in position.

3. An ice cream tray comprising a body having means for supporting ice cream cones and provided with an opening, a shelf suspended from said body beneath said opening thereby constituting a pocket for the reception of an ice cream box, a handle pivoted to said body, the forward end of said handle being adapted to extend into said pocket and engage the ice cream box to secure the same in position, and legs secured to said body and having their lower ends flush with the under side of said shelf.

4. An ice cream cone tray comprising a body having means for supporting an ice cream cone, said body being provided with an opening adapted for the reception of an ice cream receptacle, and a handle pivoted adjacent its forward end to said body and adapted to extend into said opening to engage said ice cream receptacle whereby the ice cream receptacle is securely held within the opening.

In testimony whereof we affix our signatures.

WILLIAM J. HARDING. [L. S.]
SAMUEL HARDING.